United States Patent [19]

Reed et al.

[11] 3,889,067

[45] June 10, 1975

[54] DIGITAL TELEPHONE SWITCHING SYSTEM

[75] Inventors: Irving S. Reed, Santa Monica; Irving R. Obenchain, Jr., Pacific Palisades, both of Calif.

[73] Assignee: Technology Service Corporation, Santa Monica, Calif.

[22] Filed: Oct. 24, 1973

[21] Appl. No.: 409,062

[52] U.S. Cl. .......................... 179/18 J; 179/15 AT

[51] Int. Cl. .......................................... H04m 3/00

[58] Field of Search ............ 179/18 J, 15 AT, 1 AP

[56] References Cited

UNITED STATES PATENTS 2,957,949 10/1960 James ........................... 179/15 AT

*Primary Examiner*—Ralph D. Blakeslee
*Attorney, Agent, or Firm*—Lindenberg, Freilich, Wasserman, Rosen and Fernandez

[57] ABSTRACT

A digital telephone switching system is disclosed in which voice or other communication signals are converted to digital signals and switched in the digital form. The digital signals are reconverted to analog signals and sent out on the selected line or trunk. To accomplish that, dialing signals (pulses or tones) are used to enable a selected AND gate in a matrix for transmission from the calling line to a line called, using an analog-to-digital converter on the calling line and a digital-to-analog converter on the called line. An AND gate selectively enabled in the same manner in a second matrix provides transmission from the called line to the calling line, again using analog-to-digital and digital-to-analog converters. For two-wire circuits hybrid junctions couple the calling line and the called line to the analog ends of associated analog-to-digital and digital-to-analog converters. In a second embodiment, the digital switching matrices are implemented by the use of time division multiplexing between input and output registers. In either embodiment the switching action could be controlled by a programmable digital computer.

6 Claims, 6 Drawing Figures

DIGITAL TELEPHONE SWITCHING SYSTEM

BACKGROUND OF THE INVENTION

This invention relates to electronic telephone switching systems, and more particularly to a common-control system that converts analog signals to digital signals for the switching process, and reconvertes the signal to analog form after processing through the switching system.

Historically, switches have been developed to make telephone connections in the simplest feasible way. Many switches still in use make electro-mechanical connections. More recently, faster and quieter electronic switches have been developed to provide connections, but in the same basic way, which is to provide an analog signal path through the switching matrix. Both types of switches, electro-mechanical and electronic, have been used in systems which employ a computer to control the switching matrix to provide so-called computer aided switching.

Common-control electronic switching systems are coming into greater use because of the need to minimize the size and complexity of central office equipment. A common-control system is one in which some equipment is time shared to complete calls by subscribers, as opposed to direct-control systems in which dial pulses or tones directly control originating and terminating equipments that establish a connection in a step-by-step, progressive manner.

In a typical common-control system an off-hook signal generated by a calling party causes a linefinder to be connected to the terminals of the calling line. A circuit associated with the line-finder will cause a link connector to search for an idle register sender that is time shared in the task of completing connections for other lines. When an idle register sender is found, a dial tone is placed by the register sender on the calling line. The calling party may then proceed to dial a call. The first three dialed digits are received by the register sender and decoded to select a trunk to the terminating office. A trunk is selected and a connection is made with the terminating office through the trunk in order for the next four digits dialed to be transmitted to the terminating office to effect connection of the trunk to the called line through a switching matrix. Some systems employ a computer to control the switching matrix, as just noted, using either space division multiplex or time division multiplex techniques. In either case, the connection made through the matrix is an analog signal connection using either electro-mechanical or solid-state electronic switches. With an ever increasing number of subscribers, it would be desirable to provide more economical ways of making a large number of connections in originating and terminating equipment free of cross talk. This invention, coupled with the expected continuing decline in cost of digital components, will meet this need.

SUMMARY OF THE INVENTION

In accordance with the present invention, connections are made from line to trunk, trunk to trunk, trunk to line, or line to line, in an electronic telephone switching system using only digital techniques in the actual connections. For purposes of defining this invention in the claims, a trunk is regarded to be the same as a line. The invention depends on converting a telephone communications signal on an incoming line from analog to digital form, routing the digital signal to a desired outgoing line through digital switching means, and reconverting the digital signal to analog form before placing the switched signal on the outgoing line. Either time-division or space-division multiplexing may be employed in the digital switching means. In a space-division system, the connecting means is comprised of a matrix of buffered AND gates. One input terminal of each AND gate is connected to one input line, and a second terminal of the AND gate is connected to a digital select signal. Dialed numbers are decoded to provide the digital select signal required to enable one AND gate to couple one line to another for transmission of a communication in one direction. A similar matrix is provided for transmission of communications in the other direction.

In a time-division system, signals on incoming lines are continually sampled and converted to digital form in sequence under control of a clock pulse counter. While a give sample is being taken from a line, the previous sample from that line is transmitted over a channel common to all lines, each of which may be called simultaneously. The common channel is connected to terminating lines through digital-to-analog converters which are activated to receive digital signals when called at times corresponding to sampling times of the calling lines. The code of the line called is decoded by a decoder associated with that called line, and the output of that decoder enables the code of the calling line to be stored in a register associated with that called line. A comparator detects when the counter is equal to the code of the calling line stored in the register. At that time, the sampled and converted signal of the calling line transmitted by its associated analog-to-digital converter over the common channel is strobed into the digital-to-analog converter associated with the called line. Signal traffic in the opposite direction is through a similar, but reversed, matrix where the codes of the calling and called lines are reversed.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
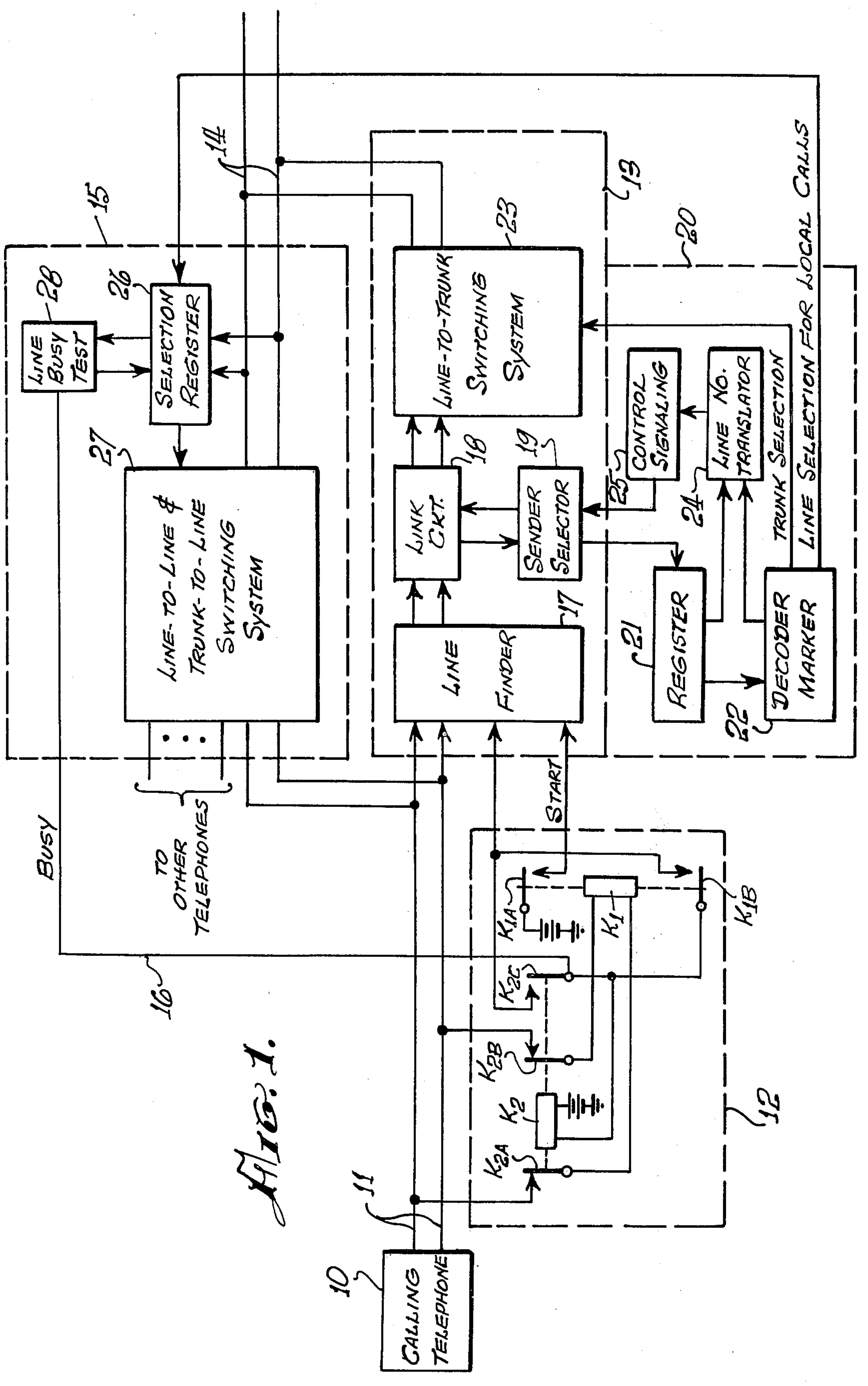
FIG. 1 illustrates in a general block diagram a system through which a telephone line is connected to a called line through originating and terminating equipment, either or both of which employ switching systems according to the present invention.

A typical subscriber line circuit is disclosed in FIG. 1 by way of illustrating an environment for the invention, and not by way of limitation. It is recognized that many different telephone systems are in operation, each with its own design for the subscriber line circuit, and virtually any system can benefit from the present invention. Consequently, the subscriber line circuit is not to be deemed a limitation on the invention. For example, some systems, such as the Bell Systems No. 1 ESS, employ a Ferrod Line Scanner to monitor the states of the subscriber lines. The outputs of the Scanner are then used to determine when the line is not in use (on-hook), when a call is initiated (off-hook), when a call is still in progress (still off-hook) and finally when the call is completed (on-hook again).

In this example, an off-hook condition of a telephone 10 causes current to flow in the lines 11 connected directly to a subscriber line circuit 12 in the central office. The subscriber line circuit is comprised of several relays. The solenoid coil of a relay $K_1$ is in series with the calling lines 11 so that when the handset is lifted, contacts in the telephone close a circuit to energize that relay. closing the contact $K_{1A}$ of the relay $K_1$ produces a START signal to initiate a call in originating equipment 13. Once the originating equipment begins making a connection to a trunk 14, the solenoid of a relay $K_2$ is energized through closed contact $K_{1B}$ to deenergize the relay $K_1$, thus terminating the start signal. Contact $K_{1B}$ then opens, but relay $K_2$ is kept energized by closed contact $K_{2C}$.

The START signal causes a line-finder 17 to be connected to the terminals of the calling line. A link circuit 18 associated with the line-finder will signal a sender selector 19 to search for an idle register sender 20 which sends back a dial tone on the calling line 11. The caller then dials. The first three digits are stored in a register 21 for use in a decoder-marker 22 for selection of a local line or a trunk to a terminating office via a switching system 23, which may be implemented in accordance with the present invention.

While the decoder-marker 22 and switching system 23 are selecting a trunk, the four digits of the number of the line being called are stored in the register 21. Once a trunk to another central office is selected and a connection is made, a line number translator 24 transmits the line number (four digits) stored in the register 21 via a selection control signaling circuit 25. For a local call to another telephone, the decoder-marker will respond to the first three digits dialed and select through the switching system 15 a line designated by the next four digits dialed. In that manner, the first three digits are used to select a trunk over which the next four digits are sent or, in the case of a local call, to route the next four digits to terminating equipment 15 of the originating central office. If the central office shown in FIG. 1 is receiving a call over a trunk 14 the terminating equipment receives the "next four digits" for selecting a line. This can all be expanded to accommodate direct long distance dialing in a direct and analogous manner.

At the terminating office, equipment like the terminating equipment 15 at the originating office receives the selection control signals as dialed numbers. To complete the general description of a call, reference will now be made to the terminating equipment 15 in FIG. 1, assuming for that purpose that the system shown is at the receiving office.

The selection control signals are received and stored in a register 26 for selection through a switching system 27 of the line called. Before the selection is made, a line-busy testing circuit 28 determines whether the line called is busy. If so, it transmits a busy signal to the originating line through the trunk selected, and if not, the line dialed is connected through the circuit 27. The manner in which a busy signal is generated and transmitted to the calling line is conventional and not part of the present invention which is directed at implementing the functions of the blocks 23 and 27 using all digital techniques.

In the event of a local call, the selection register 26 receives the "next four digits" from the decoder marker under control of the "first three digits." The calling lines 11 are then connected to lines of another telephone connected to the originating and terminating equipment in the same manner as the telephone 10. However, a check is first made to determine if the line called is busy as in the case of an incoming call from another central office over a trunk.

It is evident from the foregoing that all that is required for trunk or line switching is a register to store the trunk or line digits for use in the digital line or trunk switching systems 23 and 27. As will become apparent the switching systems are the same for both trunk and line connections. The difference is only that trunk connections involve three digits for selecting one out of 999 trunks while line connections involve four digits for selecting 9999 lines (assuming all combinations except all zero's, are used for designating a trunk or line).

Figure 2:
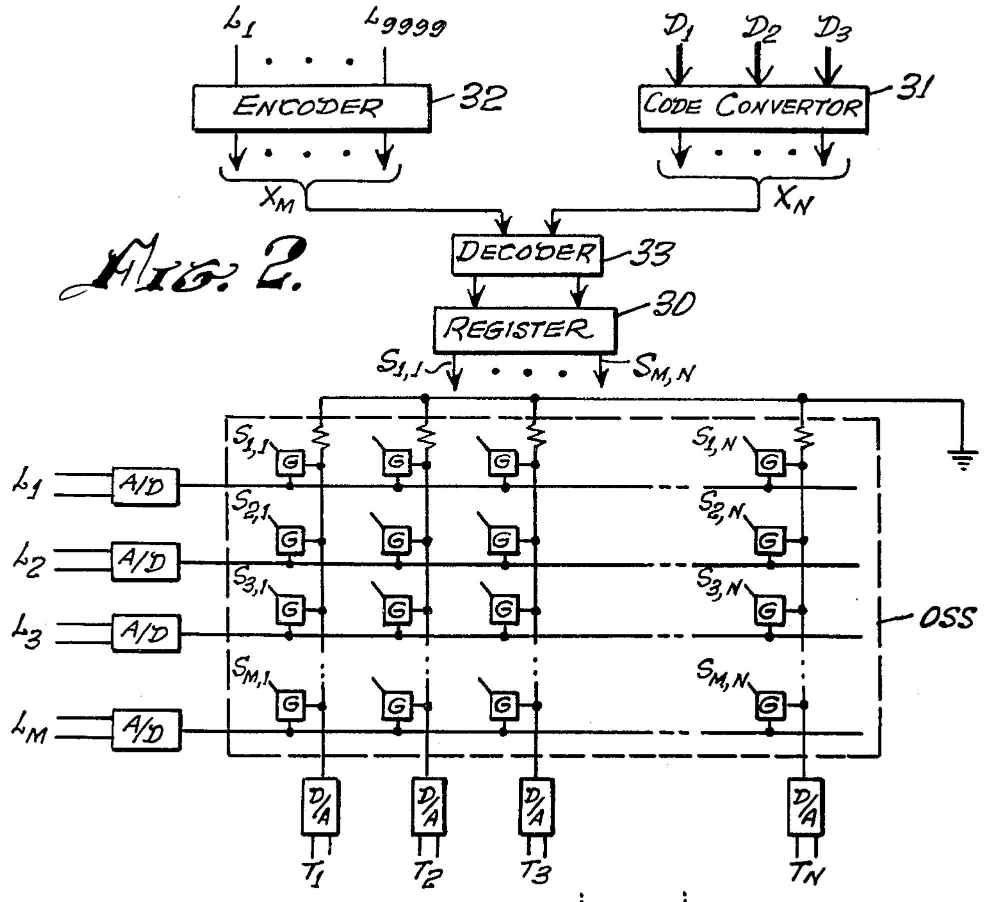
FIG. 2 illustrates an originating switching system (OSS) for the system of FIG. 1 implemented with space-division multiplexing techniques as a first embodiment.

Referring now to FIG. 2, an electronic switching system suitable for the originating equipment and/or terminating equipment of a central office will now be described. For convenience, the line-to-trunk switching system 23 of the originating equipment will be described because there the dialed digits are already decoded and the result need only be combined with the number of the calling line and the composite effectively stored in a register 30 consisting of a bank of MN flip-flops. The outputs of the flip-flops are trunk select signals, $S_{M,N}$, where the first subscript M designates the number of the calling line and the second subscript N designates the trunk line called. The latter is, of course, derived by directly converting the first three dialed digits $D_1$, $D_2$ and $D_3$ through decimal-to-binary code converter 31, and the first is derived from the number of the calling line through an encoder 32. Because binary logic is easier to implement, the encoder converts the assigned decimal number of a calling line to a binary code, or more precisely generates a binary code corresponding to the decimal line number $L_N$, where the subscript N is a number from 1 to 9999. A decoder 33 responds to the binary signals M and N to generate the signals $S_{M,N}$ stored in the register (bank of independent flip-flops) 30. The manner in which that is done is straight-forward. Since the binary code M represents the line number ($L_N = M$), and the binary code N represents the trunk number dialed ($T_N = N$), the select signal $S_{M,N}$ for the respective line and trunk combinations is generated by the simple Boolean logic equation $$S_{MN} = X_M \cdot X_N$$

where $X_M$ and $X_N$ are the logic signals,
$X_M = 1$ if line number $L_N = M$
0 otherwise
and
$X_N = 1$ if trunk number $T_N = N$
0 otherwise For example, assume line 3 is dialing trunk 2, M is then equal to the binary number 011 and N is then equal to the binary number 010. A first AND gate detects the presence of $M = 011$ and a second AND gate detects the presence of $N = 010$. A third AND gate connected to the outputs of the first and second AND gates produces a true signal $S_{3,2}$ when the outputs of the first two AND gates are both true.

The lines $L_1 - L_{9999}$ are connected by analog-to-digital (A/D) converters to an array of horizontal conductors or bus bars trunks $T_1 - T_{999}$ are connected by digital-to-analog (D/A) converters. At each intersection of a line and trunk, there is a buffered AND gate G having one input terminal connected to a control signal $S_{M,N}$ and another input terminal connected to a horizontal conductor coupled to the line $L_N$ by an A/D converter. The output of the AND gate is connected to a vertical conductor coupled to the trunk $T_N$ by a D/A converter. Such a buffered AND gate is shown in detail in FIG. 3. Binary 1's and 0's are represented by positive and zero voltages, respectively. Diodes 35 and 36 are normally forward biased through a resistor 37 such that the junction between the diodes 35 and 36 is at zero volts. Under those conditions, a diode 38 is off (insufficiently forward biased to conduct). When the select signal $S_{M,N}$ is positive at the level of the bias voltage, B+, the diode 35 is off but the diode 36 is on (sufficiently forward biased to conduct). The junction between the diodes 35 and 36 remains at zero volts. As the digital output of the A/D converter transmits binary 1's, the diode 36 is turned off thereby producing binary 1's at the outputs of the diode 38 which functions as a buffer diode.

Figures 3, 4:
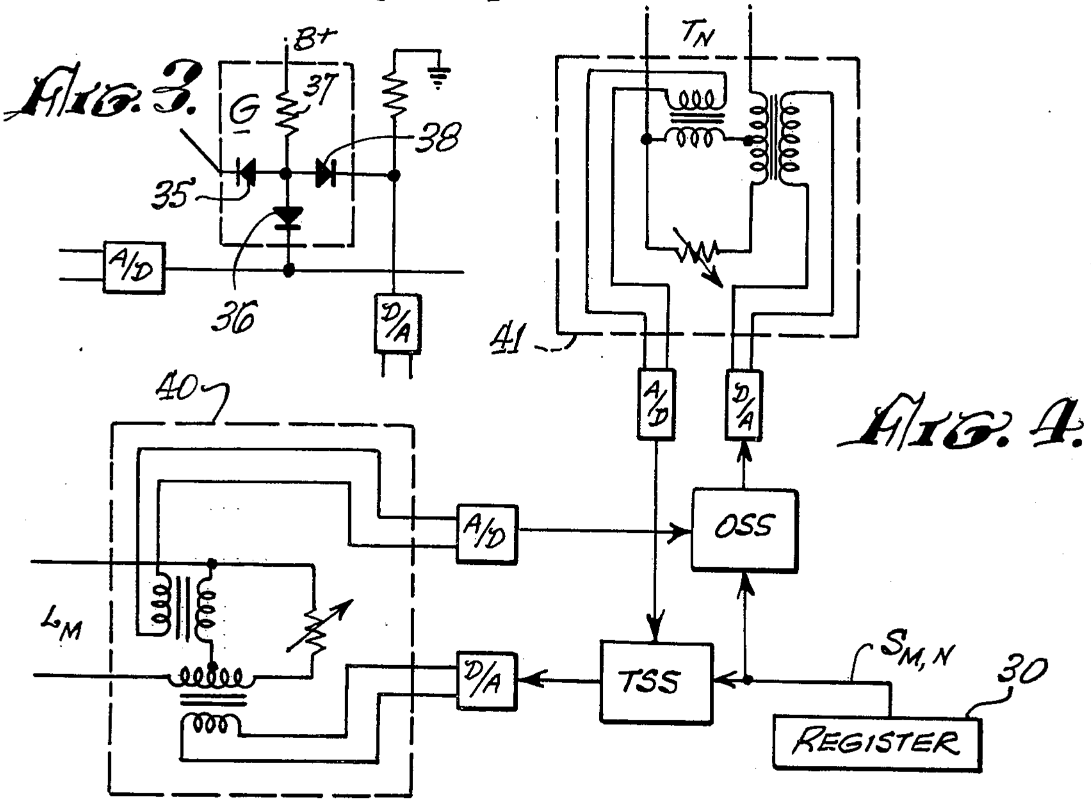
FIG. 3 is a circuit diagram of a buffered AND gate used in the switching systems of FIGS. 2 and 4.
FIG. 4 illustrates the manner in which hybrid junctions are used for connecting two-wire lines and trunks to analog-to-digital and digital-to-analog converters for two-way communications through switching equipment.
Figure 5:
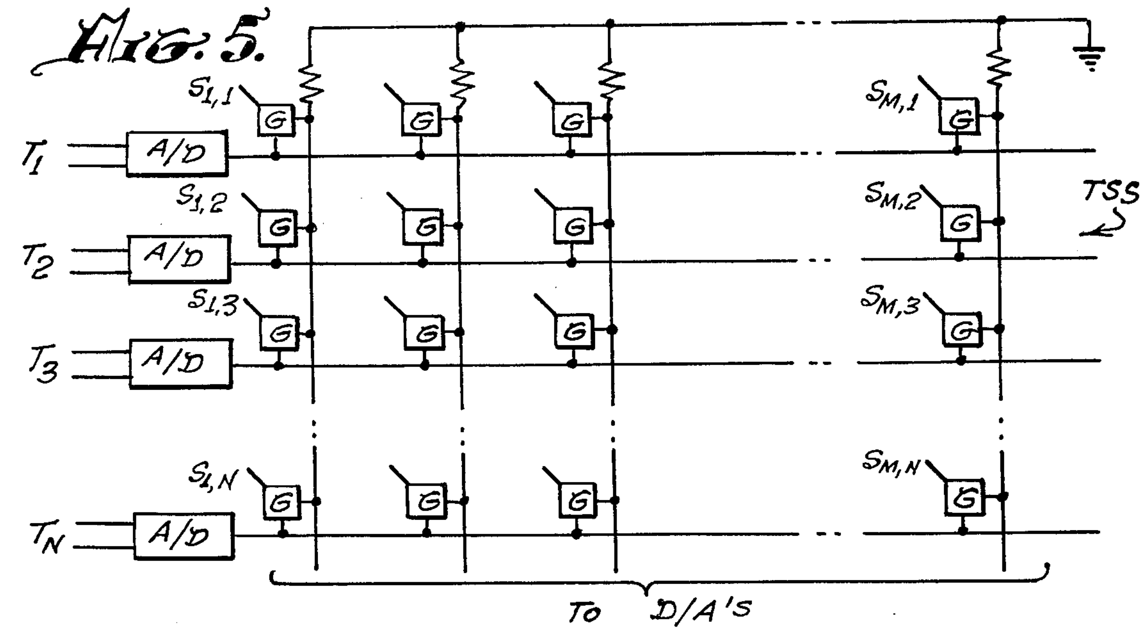
FIG. 5 illustrates a terminating switching system (TSS) for the system of FIG. 1 implemented in accordance with the techniques of the first embodiment of FIG. 2.

Each line and trunk is connected to its associated A/D and D/A converters by hybrid junctions 40 and 41, as shown in FIG. 4 for the line $L_N = M$ and trunk $T_N = N$. The selection matrix of FIG. 2 is represented in FIG. 4 by the functional block OSS (originating switching system). A functional block TSS (terminating switching system) in FIG. 4 represents a selection matrix similar to that of FIG. 2 and in parallel with that of FIG. 2, but for return communication from the trunk dialed, as shown more fully in FIG. 5. There it should be noted that the buffered AND gates at intersections between conductors or bus bars are arranged for transmission of digital data streams from trunks to lines. In that manner, two-way communications is established by a digital switching system at the originating office. The terminating office may be equipped with other switching systems, or with the same digital switching system as just described for an outgoing call. All of the D/A and A/D converters of the OSS and the TSS are synchronized in a conventional manner.

More than one line can place an outgoing call at the same time, but not through the same trunk. Consequently, to accommodate a number *k* of calls to each central office, *k* additional trunks having the same three-digit number must be added to the OSS and TSS, thus expanding the OSS and TSS to matrices of MkN gates. The code converter 31 must then be provided with means for distributing calls to the same central office among the *k* trunks.

As an example, assume calls to the central office assigned the trunk number $T_N$. The first call is assigned the control signal 1N, the next 2N and so forth to kN, each time assigning the lowest free number of the series from 1 to *k* in the decoder 33. That may be accomplished by a stepping switch or ring counter which steps through stages 1 through *k* until it finds a free trunk. A flip-flop is then set to indicate that trunk is busy. The output of that flip-flop is combined with the dialed number to form the control signal $S_{MkN}$. When all trunks are busy, an all trunk busy (ATB) signal is placed on the calling line in the conventional manner.

When a call has been completed a disconnection or release signal is placed on the trunk in response to an on-hook signal. That signal is detected to reset the associated one of the MN or MkN flip-flops used to store the select control signals $S_{M,N}$ or $S_{M,kN}$.

The line-to-line and trunk-to-line switching system 27 (FIG. 1) is implemented in a manner similar to the line-to-trunk switching system 23 insofar as handling incoming calls from another central office is concerned. However, it is expanded to accommodate line-to-line switching by providing additional conductors in the OSS and TSS matrices parallel to the conductors for the trunk lines, one additional conductor for each line of the local central office. The selection register 26 comprises an expanded MN or M,*k*N register and associated logic which is similar to that described with reference to FIG. 2 for the line-to-trunk switching system, except that now the incoming trunks and lines are encoded (M) while dialed telephone number (last four digits) are converted from decimal to a binary code (N) to provide the control signals $S_{M,N}$ or $S_{M,kN}$, where k is now a multiplier for M, or at least to that part of M relating to incoming trunks. Local incoming lines are limited to the number of lines that can be accomodated by the four dialed digits.

Figure 6:
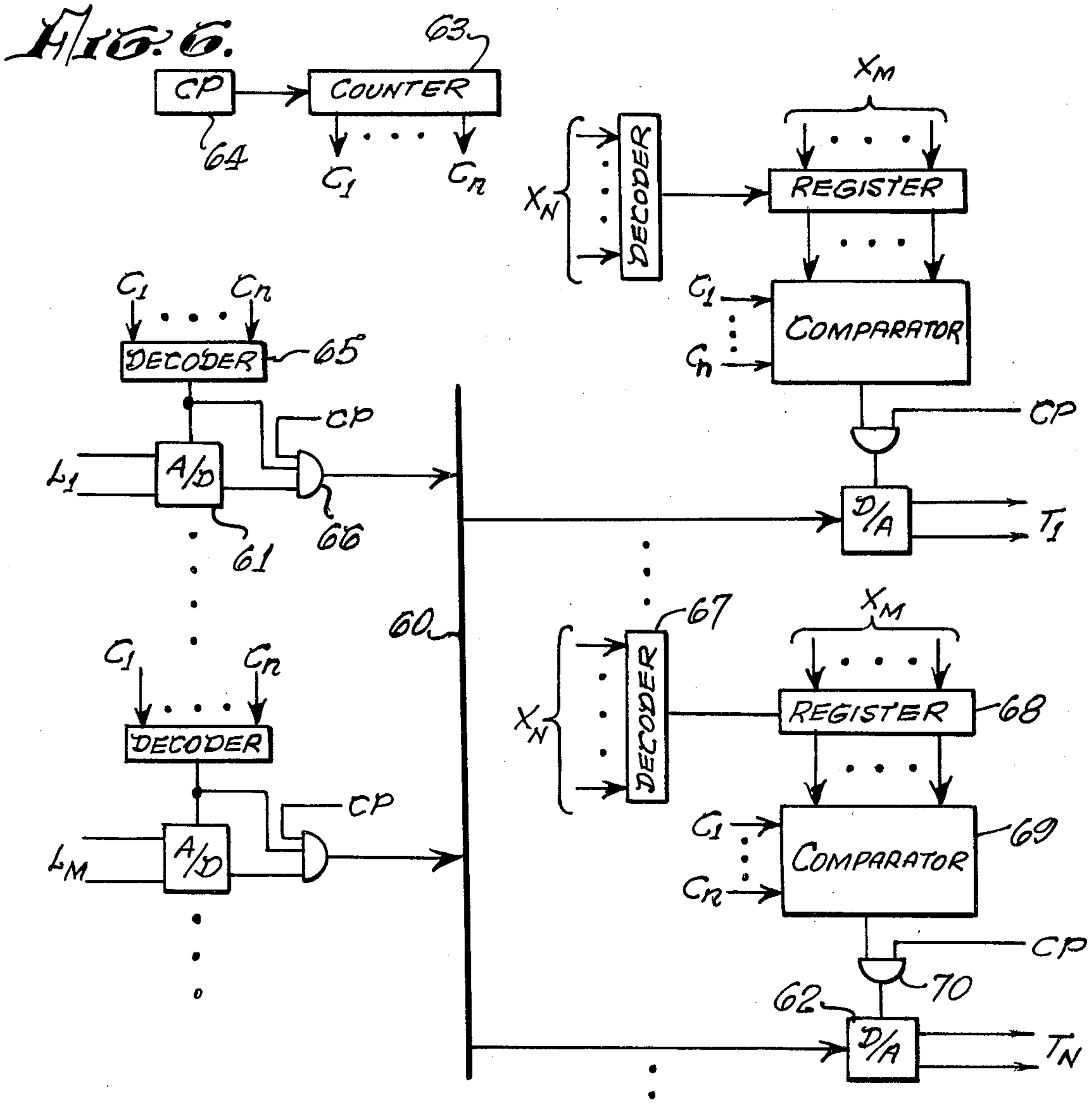
FIG. 6 illustrates a second embodiment of an originating switching system (OSS) using time-division multiplexing techniques.

A second embodiment using time-division multiplexing techniques will now be described. For convenience, an originating switching system (OSS) corresponding to that of FIG. 2 will be used as the example. It employs a common channel (or bus) 60 as shown in FIG. 6 for transmission from any A/D converter, such as a converter 61, to any D/A converter, such as converter 62.

A binary counter 63 counts clock pulses from a source 54 to cycle a binary output code $C_1$ through $C_n$, where $2^n$ is equal or greater than the number M of analog-to-digital converters. That *n*-bit code is decoded by suitable decoders assigned to the A/D converters, such as a decoder 65 assigned to the A/D converter 61. In this manner the output of the A/D converters is sampled once during each cycle of the counter.

The conversion process requires a sequence of steps which occurs in two parts. The first part is to sample the analog signal and to store the sample in a capacitor. A typical sample-and-hold circuit may be used in which the storage capacitor is first discharged and then charged to a level proportional to the analog input. The charge is then held until the next sampling period.

While the charge is held, the second part takes place, which is to convert the sample to digital form. A well known successive approximation process of conversion is ideally suited since the period for conversion always requires the same number of steps for any level of analog input.

All steps of both parts may be carried out during one period of the clock pulse source by gating synchronized clock pulses from a higher frequency source into sequence control logic of the A/D converter during the period it is enabled by its associated decoder. However, several periods of the clock pulse source may be used to complete both parts of the conversion process, so long as the process is complete before the counter 63 recycles.

It is significant to note that during the first part of the conversion process, the last sample has already been converted and is stored in digital form in a register used in the actual analog-to-digital conversion process. Consequently, a convenient time to enter new digital signals into the D/A is during the sampling part of the conversion process in the respective A/D's because the digital outputs from each is stable then.

During the sampling period, an AND gate is enabled, such as an AND gate 66, to transmit the output of the converter to the common channel. If the transmission is serial through a single gate, the bus bit rate capacity must be at least $j$ MR, where $2^j$ is the number of quantizing levels (typically 64), M the number of A/D converters to be multiplexed and R is the sampling rate (typically 8,000 samples per second) for good voice transmission. However, in the case of parallel transmission as is assumed here, the required capacity of each separate parallel bit path would be only MR. Parallel transmission is assumed for purposes of description, and for simplicity, a single gate 66 represents a bank of $j$ gates, and the channel 60 includes $j$ parallel bit paths.

The called trunk number $D_1$ $D_2$ $D_3$ is converted to a code N which is decoded by a decoder associated with the trunk $T_N$, such as a decoder 67 associated with the trunk connected to the D/A converter 62. That enables a register, such as a register 68, to enter in parallel the code M of the calling line. Thereafter, each time the counter 63 reaches the count corresponding to the code of the calling line, a comparator 69 enables an AND gate 70. The next clock pulse is transmitted through the AND gate to cause the D/A converter 62 to enter the digital signals transmitted from the A/D converter of the calling line. In the D/A converter, a buffer register accepts and stores the digital signals. A suitable ladder network connected to the output terminals of the buffer register then provides static digital-to-analog conversion between sample pulses, i.e., between periods for entry of new digital signals. When a call is complete the register 68 is cleared by the "on-hook again" signal.

A terminating switching system (TSS) would be implemented in the same way but reversed (considering the called trunk the line and the calling line the trunk) such that the code M is decoded to store the code N for comparison, and operating the A/D converters connected to the trunks in the same manner as the A/D converters connected to the lines. The TSS will, of course, have a separate "common channel."

It is noted that utilization of time-division multiplexing also provides a simple method for allowing several users to participate in a conference call. Each conferee, instead of receiving only one time slot from the common bus, is fed by several time slots (corresponding to the sampling time for the other conferees). This may be accomplished by means of a "Conference" comparator connected by the operator or auxiliary switching means to the D/A converter of each conferee. Control signals from the operator set this comparator to activate the selected D/A converter and accept the digital signals from all of the conferees. It is noted further that in most cases all subscribers would not use the switching system simultaneously and therefore an arrangement of line finders or concentrators would be employed in conjunction with the switching system described herein. This approach is normal in current telephone practice and for this invention would greatly reduce the total number of D/A and A/D converters and hybrid junctions required.

While the present invention has been described with reference to particular special purpose computer embodiments, it should be understood that practice of the invention is not limited to those embodiments. For example, the time-division multiplexing system described with reference to FIG. 6 may be implemented with software, using a programmable digital computer, rather than with hardwired components in the configuration shown. Consequently, it is not intended that the scope of the invention be determined by the embodiments disclosed, but rather should be determined by the breadth of the appended claims.

What is claimed is:

1. In a telephone system of the type in which dialing or other control signals are used to determine the connection to be made between any one of a plurality of telephone lines calling another line selected from the same or other plurality of telephone lines, a switching matrix at one site interfacing with standard two or four-wire telephone transmission lines for switching from one line to another communication signal of the form produced by the user independently of the switching matrix, said switching matrix comprising means responsive to a calling line initiating a call for generating a digital code, $X_M$, uniquely identifying said calling line, means responsive to control signals received from said calling line for generating a digital code, $X_N$, uniquely identifying another line called, a plurality of converting means, one for each of said plurality of lines which may be calling, each converting means serving to convert communication signals received from its associated line to digital form, a plurality of reconverting means, one for each of said plurality of lines which may be called, each reconverting means serving to convert communication signals received to analog form for transmission through its associated line, and switching means resposive to said digital codes $X_M$ and $X_N$ for routing communication signals in digital form from a converting means associated with a calling line to a reconverting means associated with a called line, all of said converting, switching and reconverting means being at said one site, whereby all transmission to and from said switching matrix is in digital form.

2. The combination defined by claim 1 including a second similar switching matrix at said one site and responsive to said digital codes for switching communication signals from said called line to said calling line.

3. The combination of claim 2 wherein each of said switching matrices comprises a plurality of incoming bus bars, one for each incoming line, and a plurality of outgoing bus bars, one for each outgoing line, where an incoming line is a calling line in one switching matrix and a called line in the other, and an outgoing line is a called line in said one switching matrix and a calling line in the other, separate gating means for separately connecting each incoming bus bar to each outgoing bus bar such that for any outgoing bus bar selected at random, each one of the incoming bus bars is connected to it by a separate gating means, each gating means being responsive to a switching control signal to enable it to translate digital signals from an incoming bus bar to an outgoing bus bar, and means responsive to said digital codes $X_M$ and $X_N$ for generating a control signal $S_{MN}$ at a gating means uniquely identified by said digital codes for enabling said uniquely identified gating means to connect an incoming line to an outgoing line.

4. The combination of claim 3 wherein each gating means is comprised of an AND gate having two input terminals and one output terminal, one input terminal being connected to an incoming bus bar and the other being connected to receive a control signal from said control signal generating means, and said output terminal being connected to an outgoing bus bar.

5. The combination of claim 2 wherein each of said switching matrices comprises a common transmission channel, a code counter for repeatedly generating a plurality of unique digital codes in a predetermined sequence, said codes including all codes of incoming and outgoing lines, where an incoming line is a calling line in one switching system and the called line in the other, and an outgoing line is the called line in the one switching system and the calling line in the other, a source of clock pulses for driving said counter, a separate decoding means associated with each incoming line for detecting means associated with each incoming line for detecting when said counter has advanced to the code of the incoming line, means responsive to output signals from said decoding means for synchronizing said converting means on said incoming lines to operate in sequence, means responsive to output signals from said decoding means, for gating out in sequence digital signals from said converting means to said common channel, thereby effecting time-division multiplexing of digital signals from incoming lines onto said common channel, a separate register associated with each outgoing line adapted to receive and store the digital code of an incoming line involved in a telephone call, separate means associated with each register for decoding the digital code of an outgoing line involved in a telephone call, separate means associated with each outgoing line for comparing the output of said code counter with the digital code of an incoming line stored in the associated register, and a separate means responsive to the output of each comparator for synchronizing separate operation of one of said reconverting means connected to an outgoing line associated with the one of said registers being compared, thereby demultiplexing and reconverting to analog form digital signals time-division multiplexed onto said common channel in digital form.

6. The combination of claim 5 wherein said converting means and reconverting means transmit and receive respectively, digital signals in parallel, and said common channel transmits digital signals in parallel.

* * * * *